United States Patent [19]

Morine et al.

[11] Patent Number: 4,666,069
[45] Date of Patent: May 19, 1987

[54] APPARATUS FOR DISPENSING PARTICULATE MATERIAL

[75] Inventors: Richard L. Morine, Clearwater; James J. Hokes, Tampa, both of Fla.

[73] Assignee: Tineco, Inc., New Hyde Park, N.Y.

[21] Appl. No.: 800,763

[22] Filed: Nov. 22, 1985

[51] Int. Cl.⁴ .............................................. G01F 11/10
[52] U.S. Cl. ...................................... 222/368; 222/452; 221/266
[58] Field of Search ............... 222/426, 436, 444, 452, 222/367, 368, 536, 359, 414; 221/266; 111/77, 78

[56] References Cited

U.S. PATENT DOCUMENTS

| | | | |
|---|---|---|---|
| 2,059,135 | 10/1936 | Moe | 222/452 |
| 2,322,866 | 6/1943 | Merz | 222/368 |
| 3,163,333 | 12/1964 | Lindaberry | 222/368 |
| 3,391,831 | 7/1968 | Wolf | 222/368 |
| 4,076,150 | 2/1978 | Didrickson | 222/368 |
| 4,511,067 | 4/1985 | Martin et al. | 222/368 |

Primary Examiner—Joseph J. Rolla
Assistant Examiner—Kenneth Noland
Attorney, Agent, or Firm—Daniel G. Blackhurst

[57] ABSTRACT

An apparatus for dispensing particulate material in a predetermined pattern over a subjacent surface. The apparatus includes an elongated hopper having a downwardly facing discharge mouth. A rotary dispensing shaft extends the length of the mouth. The shaft has a plurality of material receiving grooves formed to extend longitudinally thereof and sized to receive predetermined amounts of particulate material. Positioned about the shaft member and extending the length thereof is an elongated cylindrical sleeve which is mounted for selective rotation relative to the shaft with its exterior surface in sealing engagement with the mouth of the hopper. First and second circumferentially spaced, generally longitudinally extending openings are formed through the sleeve. The openings are located such that in a first position of the sleeve the first openings provide communication from the mouth to the material receiving grooves in the shaft and the second openings provide communication from the shaft to the exterior of the sleeve. In the second position of the sleeve the mouth is sealed from the shaft.

9 Claims, 6 Drawing Figures

APPARATUS FOR DISPENSING PARTICULATE MATERIAL

BACKGROUND OF THE INVENTION

The subject invention is directed toward the art of dispensing apparatus and, more particularly, to an apparatus for dispensing particulate material in a predetermined pattern and at controlled rates.

The invention is especially suited for use in the baking industry dispensing poppy seeds, sesame seeds and the like and will be described with reference thereto. However, as will become apparent, the invention is capable of broader application and could be used for dispensing a variety of materials in different environments.

In the baking industry a variety of different dispensing devices are used to apply poppy and sesame seeds to dough pieces as they are moving on a conveyor. One such device comprises a seed supply hopper arranged to be mounted with its outlet extending across and above the conveyor. Associated with the hopper outlet is a dispensing shaft which extends the length of the hopper. The shaft is mounted for rotary movement in close proximity to the sides of the outlet. Formed in the exterior of the shaft are circumferential groups of longitudinally extending grooves. The groups are spaced to correspond to the transverse spacing between the dough pieces on the conveyor, or the desired pattern of dispensing. As the grooves rotate through the hopper discharge they receive seeds which drop from the grooves as rotation continues. By varying the speed of shaft rotation the quantity discharged can be controlled. Also, the quantity dispensed or the pattern of dispensing can be varied by changing the dispensing shaft, i.e. substitute a shaft with different groove sizes and/or groove spacing.

In prior devices of the type described it has been necessary to empty all seed from the hopper before shaft changing could take place. Otherwise, the seed poured from the hopper when the shaft was removed. Alternatively, to avoid the need for emptying the hopper it has been proposed to mount the hopper so that it can be rotated to an inverted position for dispensing shaft changing. This, of course, required that the hopper be fitted with a suitable top closure and special mounts.

The subject invention overcomes the above mentioned problems and provides a dispenser of the type described wherein the dispensing shafts can be removed and changed rapidly without emptying the hopper or providing special hopper mounts.

BRIEF DESCRIPTION OF THE INVENTION

Specifically, and in accordance with one aspect, the invention comprises an elongated hopper for holding a supply of particulate material and adapted to be mounted generally horizontally above a surface onto which the material is to be dispensed. The hopper includes an elongated, downwardly facing, generally horizontal discharge mouth defined by a pair of relatively closely spaced side walls joined to the hopper. An elongated, cylindrical dispensing shaft member extends the length of the mouth. The shaft member has a plurality of material receiving grooves extending generally longitudinally thereof and sized to receive predetermined amounts of particulate material. Support means are provided for mounting the shaft member for rotation about its longitudinal axis. Positioned about the shaft member and extending the length thereof is an elongated, cylindrical sleeve which is mounted for rotation relative to the shaft member with its exterior surface in sealing engagement with the mouth of the hopper. First and second circumferentially spaced, generally longitudinally extending openings are formed through the sleeve. The openings are located such that in a first position of the sleeve the first openings provide communication from the mouth to the material receiving grooves in the shaft, and the second opening means provide communication from the shaft to the exterior of the sleeve. In the second position of the sleeve the mouth is sealed from the shaft.

As can be seen, by rotating the sleeve member it is possible to close off the flow of seeds from the hopper through the mouth to the dispensing shaft. With the sleeve in the closed position the shaft can be removed for changing without loss of seed through the mouth.

In accordance with another aspect of the invention there are provided means for selectively rotating the shaft between the first and second positions. The means include means for interlocking the shaft in position in the sleeve such that the shaft cannot be removed when the sleeve is in the first position. However, the interlock means allow the shaft to be freely removed from the sleeve when the sleeve is in the second position.

Accordingly, a primary object of the invention is the provision of a rotary shaft type dispensing apparatus which is arranged to facilitate changing of the dispensing shafts.

Yet another object is the provision of an apparatus of the type described which includes means for preventing removal of the dispensing shaft until the hopper discharge mouth has been sealed.

A still further object is the provision of dispensing apparatus of the type described which is simple to use and which can be readily changed to dispense in a variety of patterns.

Another object is the provision of a dispensing apparatus that does not have to be emptied before changing the dispensing elements.

BRIEF DESCRIPTION OF THE DRAWINGS

The above and other objects and advantages will become apparent from the following description when read in conjunction with the accompanying drawings wherein.

DETAILED DESCRIPTION OF THE PREFERRED EMBODIMENT

Figure 2:
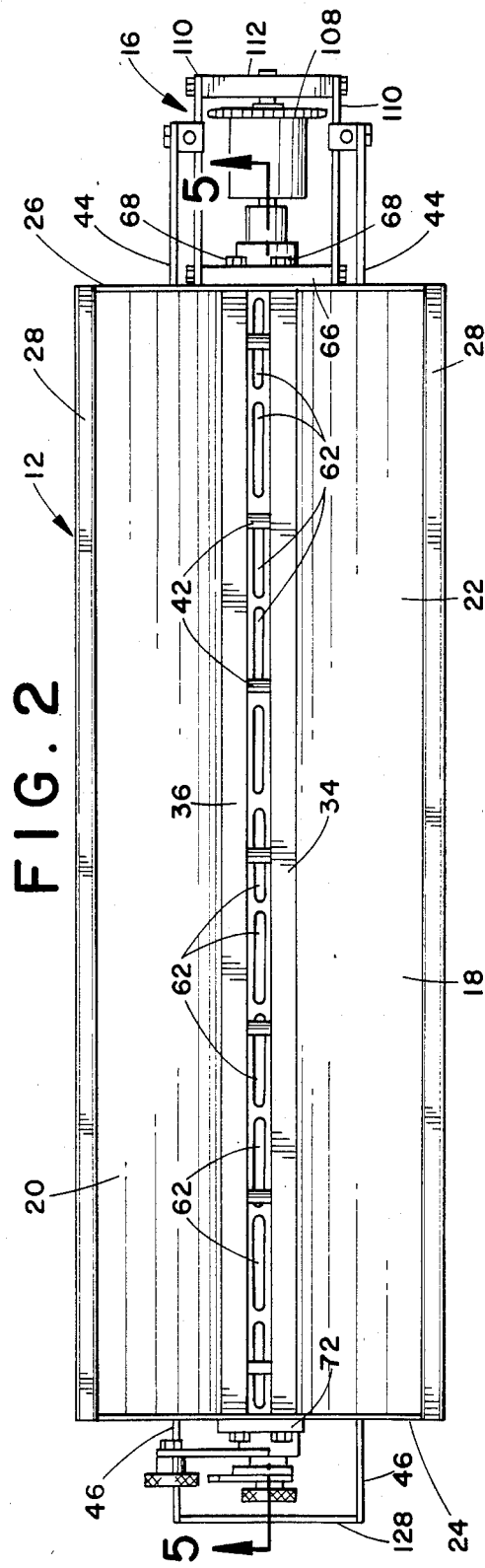
FIG. 2 is a view taken on line 2—2 of FIG. 1.
Figure 1:
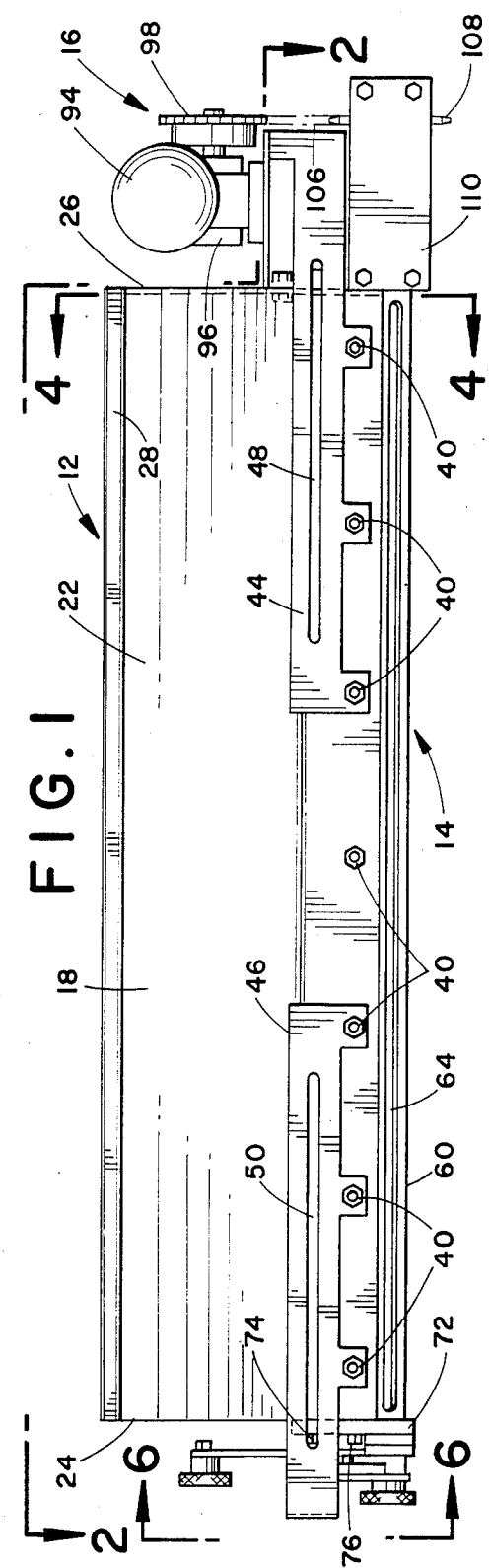
FIG. 1 is a front elevational view of dispensing apparatus formed in accordance with a preferred embodiment of the invention.
Figure 3:
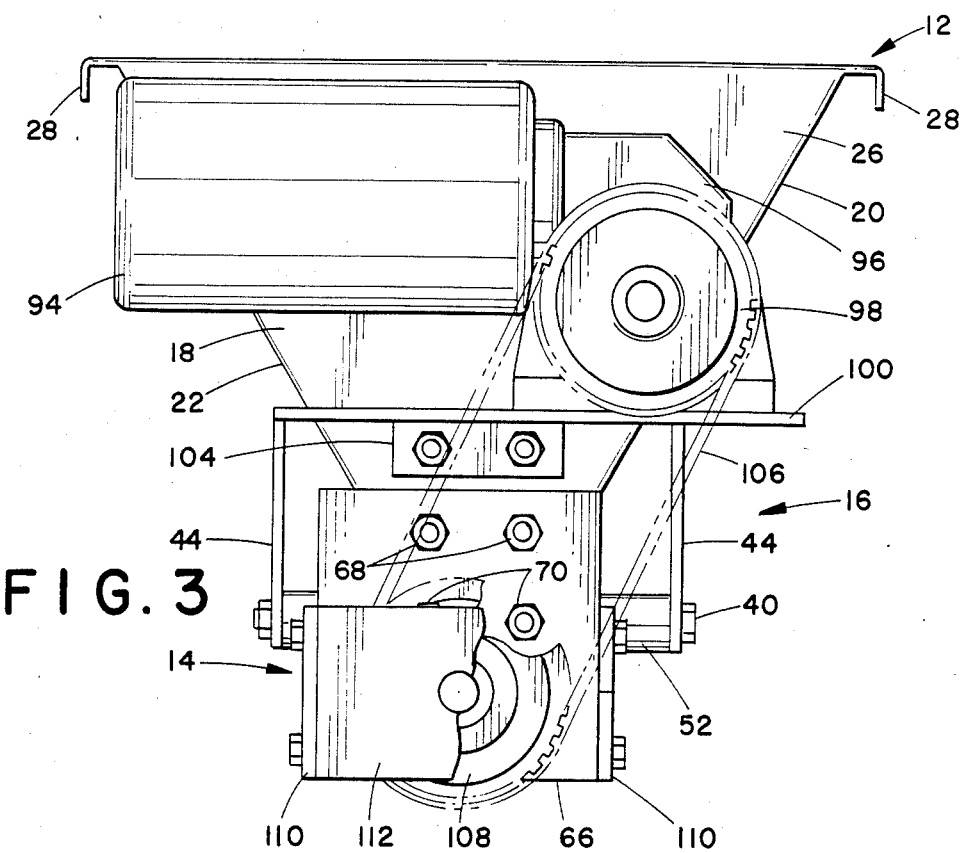
FIG. 3 is a view showing the right-hand end elevation of the apparatus of FIG. 1.

Referring more particularly to the drawings wherein the showings are for the purpose of illustrating a preferred embodiment of the invention only, and not for the purpose of limiting same, FIGS. 1-3 show the overall arrangement of a dispensing apparatus 10 which includes a storage hopper assembly 12, a dispensing assembly 14 and a drive assembly 16.

In the embodiment under consideration the hopper assembly 12 includes a horizontally elongated hopper 18 having a pair of inclined side walls 20 and 22 connected by end walls 24 and 26. The hopper 18 is formed from many suitable material such as, for example, stainless steel sheet. Likewise, the various components are joined in any suitable manner such as through the use of welding.

As best shown in FIG. 3, suitable reinforcing flanges 28 extend along the upper edge of each of the inclined side walls 20, 22. The lower ends of the side walls 20, 22 terminate in end portions 30, 32 respectively (see FIG. 4).

Figure 4:
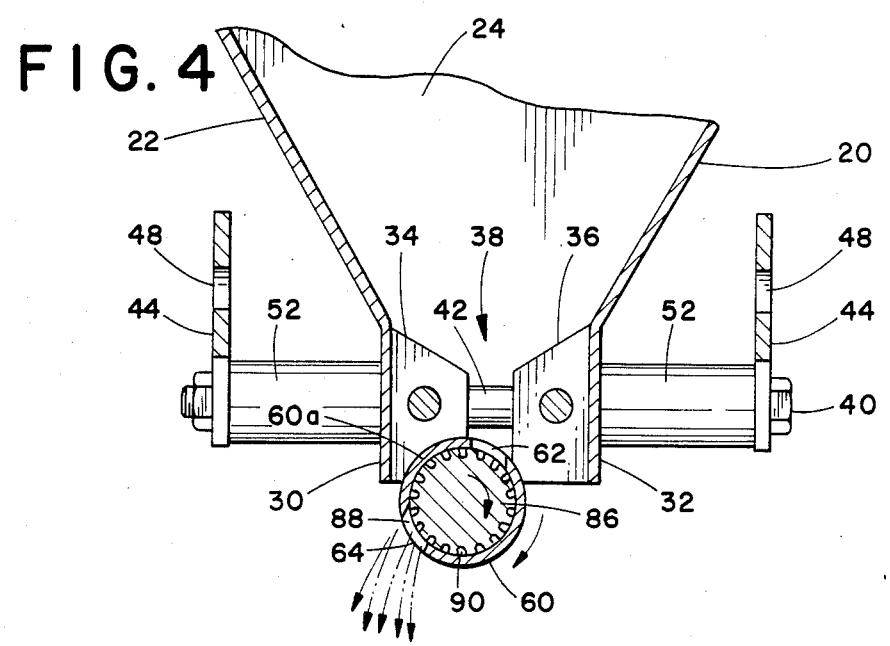
FIG. 4 is a partial cross-sectional view taken on line 4—4 of FIG. 1.

Mounted between end portions 30, 32 of side walls 20, 22 are a pair of horizontally extending elongated block elements 34 and 36 which cooperate to define a hopper discharge mouth or outlet slot 38. As best shown in FIG. 2, the members 34, 36 extend the length of the hopper assembly 12 between end walls 24 and 26. Members 34 and 36 could be held in position in any suitable manner; however, in the subject embodiment, horizontally extending tie bolts 40 pass through the side wall end portions 30, 32 and the block members 34, 36. The tie bolts 40 pass through spacers 42 located at spaced points longitudinally of the discharge mouth 38 and between the block members 34, 36 as shown in FIGS. 2 and 4.

Figures 5, 6:
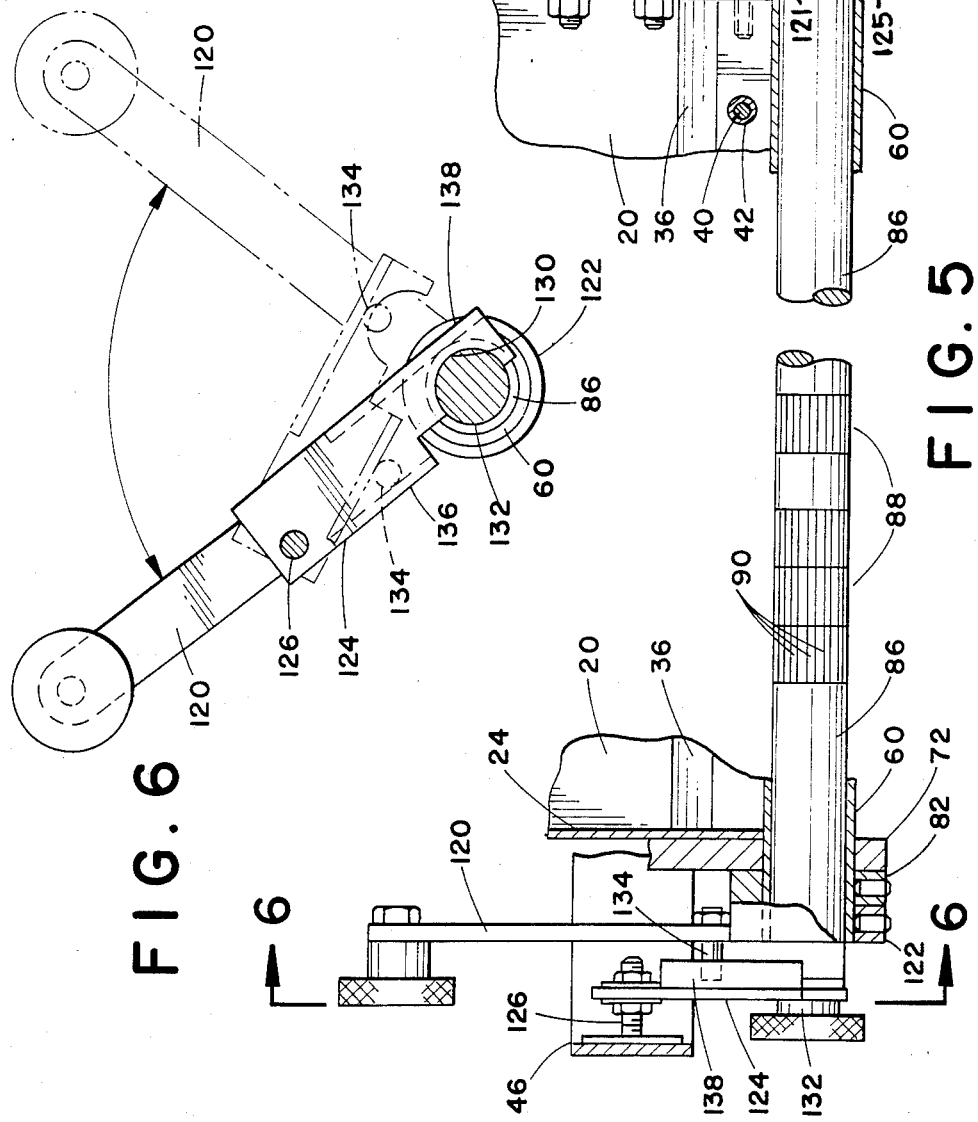
FIG. 5 is a cross-sectional view taken on line 5—5 of FIG. 2.
FIG. 6 is a partial end view taken on line 6—6 of FIG. 5.

The hopper assembly thus far described is arranged for horizontal mounting above a subjacent, surface, conveyor or the like not shown. In the embodiment under consideration, the mounting means comprise pairs of horizontal support plates 44 and 46 which are spaced outwardly from the sides of the hopper 18 and extend generally longitudinally thereof. Each of the support plates 44, 46 include a centrally located, elongated opening 48, 50, respectively. These openings provide means for connecting the hopper assembly to any suitable type of supports extending upwardly from the subjacent conveyor or the like. As best shown in FIGS. 4 and 6, the support plates 44, 46 are connected to the hopper assembly by the previously mentioned tie bolts 40. As shown, bolts 40 extend through suitable openings provided in the side plates 44, 46 and pass through spacer members 52 positioned between the support plates and the associated side wall 20 or 22 of hopper 18.

Extending longitudinally of the hopper assembly 12 at a position closely adjacent the discharge mouth 38 is the previously mentioned discharge assembly 14. As best shown in FIGS. 4 and 5, the discharge assembly includes an elongated sleeve like member 60 which is mounted closely in sealing engagement with the previously mentioned block members 34, 36 (see FIG. 4). The sleeve 60 is mounted for selective rotation relative to mouth 38 and, for this reason, each of the members 34, 36 have a lower end contoured to closely and sealingly engage the outer surface of sleeve 60. Additionally, for this reason, it is preferable that the blocks 34, 36 be formed from a suitable wear resistant material having suitable lubricity such as nylon or the like. In the embodiment under consideration sleeve 60 includes a first longitudinally extending series of openings 62 (see FIGS. 2 and 4). A second elongated opening 64 extends substantially the length of sleeve member 60 as shown in FIG. 1.

Sleeve 60 is rotatably supported as previously mentioned. Many different types of support means could be provided; however, in the subject embodiment the sleeve 60 is supported at its right-hand end (see FIG. 5) in a support block 66 which is suitably connected to the end wall 26 of hopper 18 by bolts 68 and machine screws 70. A similar block or support member 72 extends downwardly from the hopper end of wall 24 and supports the left end of shaft 60. Block 72 is similarly connected to the end wall by bolts 74 and machine screws 76. The sleeve 60 is maintained in position in the blocks 66, 72 by a collar 80 connected to the right-hand end and a second collar 82 connected to the left-hand end and bearing against the support plate 72.

Rotatably mounted within sleeve 60 is an elongated cylindrical dispensing shaft 86. The shaft 86 is closely received within the sleeve 60. About the exterior of the shaft 86 at longitudinally spaced locations are a plurality of individual grooved sections 88. Each of the grooved sections 88 comprises a plurality of closely spaced, longitudinally extending individual grooves 90. The grooves 90 are sized so as to be large enough to receive the individual seeds or other particulate material passing through the mouth 38 of the hopper assembly 12. As is apparent, by varying the layout of the grooved sections 88 and the size or depth of the grooves 90 the dispensing pattern and quantity dispensed can be varied.

Referring again to FIG. 4, it will be seen that seeds or other particulate material from hopper assembly 12 pass through the mouth 38 and the groove or opening 62 in sleeve 60. As the shaft 86 is rotated past opening 62 seeds from within the mouth 38 enter the grooves 90. Further rotation of the shaft 86 conveys the filled grooves 90 past the outlet opening or passage 64 where the seeds fall from the grooves by gravity to the subjacent surface or conveyor.

Many different types of drive means could be provided for selectively rotating the dispensing shaft or mandrel 86. In the subject embodiment, the drive assembly 16 includes a variable speed motor 94 connected through a light angle gear reducer 96 with a sprocket 98. The motor and gear reducer unit is supported from a plate 100 carried by the right-hand end of the support plates 44 and by a plate 104 bolted to the end wall 26 of hopper 18.

The sprocket 90 is connected through a chain 106 with a second drive sprocket 108. In the embodiment under consideration the drive sprocket 108 is carried from a generally U-shaped frame comprising a pair of side plates 110 joined to the opposite ends of the previously mentioned plates 66. At their outer free end plates 110 are connected with a cross-member 112. As shown, the plates of the U-shaped frame are joined by machine screws. The sprocket 108 has one end of its shaft 114 supported from a suitable bearing carried in plate 112. At its opposite end the shaft 114 is threaded into a sleeve member 116 (see FIG. 5). The sleeve 116 is mounted for rotation in a sleeve bearing 118 carried in the right-hand end of the previously mentioned sleeve 60. This permits free driving rotation of the sleeve 116 relative to the sleeve 60. The sleeve 116 is releasably connected to the dispensing shaft 86 by cross-pins 121 carried in an outwardly extending reduced diameter end portion 123 formed on shaft 86. Suitable slots 125 are formed in the end of sleeve 116 to provide a driving connection between sleeve 116 and shaft 86. In addition, this arrangement permits the shaft 86 to be axially withdrawn to the left (as viewed in FIG. 5) from the sleeve 116.

Although not shown, it should be understood that the drive motor 94 can be manually controlled or actuated through the use of conventional sensors operable in response to the presence of a pan or other item at a suitable location on the conveyor or associated equipment (not shown).

As mentioned earlier, the dispensing shaft 86 can be withdrawn out the left end of sleeve 60 (see FIG. 5) for changing the pattern of dispensing or the like. When the shaft 86 is changed the sleeve member 60 is rotated clockwise (as viewed in FIG. 4) so that the imperforate section 60a blocks the exit from mouth 38 and prevents loss of material from hopper 18. According to one aspect of the subject invention, means are provided to interlock the position of the sleeve 60 with the shaft 86 so that the shaft cannot be removed except when the sleeve 60 is in position to block mouth 38.

The interlocking means could take a variety of forms; however, the preferred form can best be understood by reference to FIGS. 5 and 6. As shown therein, the sleeve 60 is provided with a manually operable handle 120 carried on a collar 122 releasably connected to the left end of sleeve 60. The arcuate extent of movement of handle 120 is limited by support members 46 to the solid and dotted line positions shown in FIG. 6. These positions correspond, respectively, to the open and closed positions of sleeve 60.

To prevent shaft 86 from being removed except when handle 120 is in the dotted line position of FIG. 6, a latch plate member 124 is mounted for pivotal movement on a stud 126. Stud 126 extends to the right from a support plate 128 connected across the left ends of members 46 (see FIG. 5). Latch plate 124 includes an arcuately recessed end portion 130 which, as shown in FIG. 6, is located to engage in the reduced diameter end 132 behind the full diameter portion of shaft 86. Thus, when in the solid line position of FIG. 6, plate 124 prevents withdrawal of shaft 86. Movement of plate 124 to the dashed line position releases it from engagement with shaft 86 and allows the shaft to be removed.

Movement of plate 124 between the solid and dotted line positions is related to the movement of handle 120 by a stud 134 extending from handle 120 as shown in FIGS. 5 and 6. The stud 134 extends between a pair of plates 136, 138 joined to plate 124. As can be appreciated, when the handle 120 is swung to the left, as viewed in FIG. 6, stud 134 engages plate 136 and drives latch plate 124 to the solid line, latched position. Conversely, when handle 120 is swung to the right, the stud engages plate 138 and swings latch plate 124 upwardly to the dotted line, unlatched position.

The invention has been described with reference to the preferred embodiment. Obviously, modifications and alterations will occur to those skilled in the art. It is intended to include all such modifications and alterations insofar as they come within the scope of the following claims or the equivalents thereof.

Having thus described the invention, it is now claimed:

1. An apparatus for dispensing particulate material comprising:
   (a) an elongated hopper for holding a supply of particulate material, said hopper adapted to be mounted generally horizontally above a surface onto which the material is to be dispensed;
   (b) an elongated, downwardly facing, generally horizontal discharge mouth formed in said hopper, said mouth being defined by a pair of relatively closely spaced side walls connected to said hopper;
   (c) an elongated cylindrical dispensing shaft member extending the length of said mouth, said shaft member having a plurality of material receiving grooves extending generally longitudinally thereof and sized to receive predetermined amounts of particulate material therein;
   (d) support means for mounting said shaft member for rotation about its longitudinal axis;
   (e) an elongated cylindrical sleeve member closely surrounding said shaft member and extending the length thereof;
   (f) mounting means rotatable supporting said sleeve member with its exterior surface in sealing engagement with the side walls of said mouth for selective movement between at least first and second positions;
   (g) first and second circumferentially spaced, generally longitudinally extending opening means formed through said sleeve, said opening means being located such that (i) in the first position of said sleeve said first opening means provides communication from said mouth to the material receiving grooves in said shaft and said second opening means provides communication from said shaft to the exterior of said sleeve, and (ii) in the second position of said sleeve said mouth is sealed from said shaft; and, wherein said support means for mounting said shaft include means for permitting said shaft to be withdrawn from said sleeve; and, including latch means which prevent withdrawal of said shaft except when said sleeve is in said second position.

2. The apparatus as defined in claim 1 including means for manually moving said sleeve between said first and second positions.

3. The apparatus as defined in claim 1 including means for rotating said shaft member at selected speeds to vary the amount of material dispensed.

4. The apparatus as defined in claim 1 wherein said first and second openings means comprise longitudinally extending slots formed in said sleeve.

5. The apparatus as defined in claim 1 wherein said side walls include arcuate portions which engage said sleeve.

6. The apparatus as defined in claim 1 wherein said grooves are formed in said shaft in longitudinal spaced groups.

7. The apparatus as defined in claim 1 including a handle for selectively moving said sleeve member between said first and second positions; and, means interconnecting said latch means and said handle for moving said latch means to a delatched position when said sleeve is mounted to said second position.

8. The apparatus as defined in claim 1 wherein said latch means comprises a plate member mounted for pivotal movement relative to said shaft member; and, means for moving said plate member to a delatch position simultaneously with movement of said sleeve to said second position.

9. The apparatus as defined in claim 8 including a handle for manually moving said sleeve member to said second position and wherein said plate member is carried by said handle.

* * * * *